(12) United States Patent
Riveiro et al.

(10) Patent No.: US 10,095,451 B2
(45) Date of Patent: Oct. 9, 2018

(54) PRINTING DEVICE PROXIMITY BEACON IDENTIFICATIONS

(71) Applicant: Hewlett-Packard Development Company, L.P., Houston, TX (US)

(72) Inventors: Marcio Riveiro, Porto Alegre (BR); Carlos Leao, Porto Alegre (BR)

(73) Assignee: Hewlett-Packard Development Company, L. P., Houston, TX (US)

( * ) Notice: Subject to any disclaimer, the term of this patent is extended or adjusted under 35 U.S.C. 154(b) by 0 days.

(21) Appl. No.: 15/290,524

(22) Filed: Oct. 11, 2016

(65) Prior Publication Data
US 2018/0101342 A1  Apr. 12, 2018

(51) Int. Cl.
*G06F 3/12* (2006.01)
*H04W 8/00* (2009.01)

(52) U.S. Cl.
CPC .......... *G06F 3/1236* (2013.01); *G06F 3/1203* (2013.01); *G06F 3/1226* (2013.01); *G06F 3/1292* (2013.01); *H04W 8/005* (2013.01)

(58) Field of Classification Search
None
See application file for complete search history.

(56) References Cited

U.S. PATENT DOCUMENTS

| | | |
|---|---|---|
| 2014/0114782 A1 | 4/2014 | Cloin et al. |
| 2015/0006761 A1 | 1/2015 | Miller et al. |
| 2015/0373635 A1 | 12/2015 | Wang |
| 2016/0127600 A1 | 5/2016 | Beatty |
| 2016/0360477 A1* | 12/2016 | Saeki ....................... B41J 29/00 |

* cited by examiner

*Primary Examiner* — Barbara Reinier
(74) *Attorney, Agent, or Firm* — Brooks Cameron & Huebsch PLLC

(57) ABSTRACT

Example implementations relate to connection identification. For example, a system for connection identification may include determining that a source of a received first beacon is within a proximity of a user device, comparing a portion of the received first beacon to a portion of a received second beacon associated with a printing device, confirming that the source of the received first beacon is the printing device based on the comparison, and identifying a connection between the printing device and the user device.

15 Claims, 3 Drawing Sheets

PRINTING DEVICE PROXIMITY BEACON IDENTIFICATIONS

BACKGROUND

User devices may be mobile. User devices may generate a print job while moving through various environments. Printing devices may be located at various locations throughout various environments. A user device may locate and connect with a printing device to transmit the print job.

DETAILED DESCRIPTION

Figure 1:
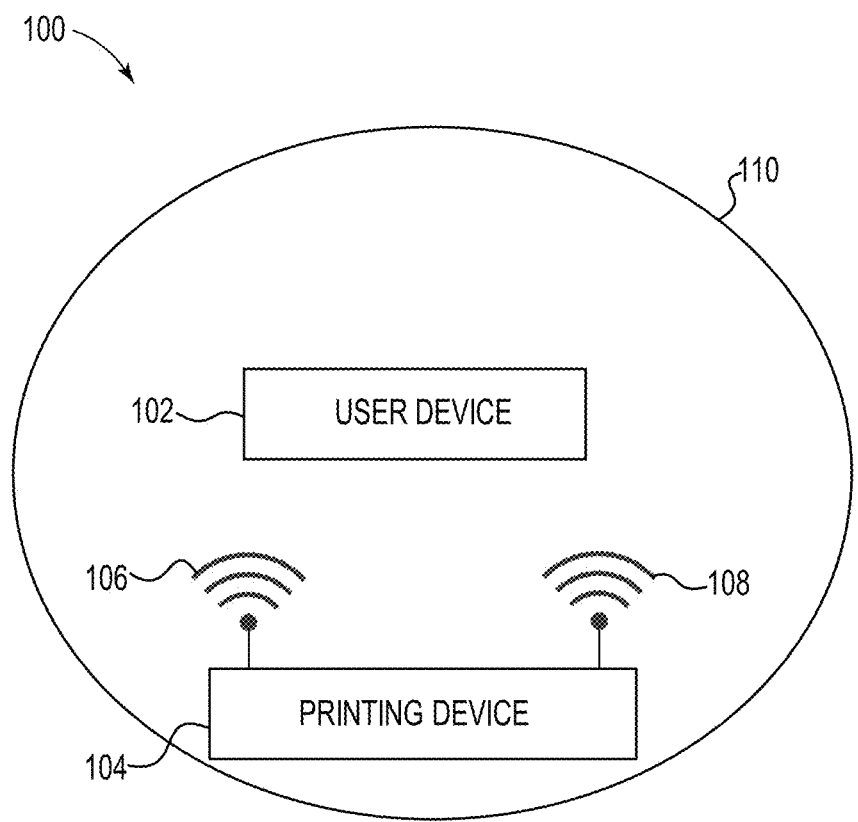
FIG. 1 illustrates a diagram of an example system for connection identification, according to the present disclosure.

A user device may generate print jobs. As used herein a user device may be a computing device such as a laptop, phone, tablet, desktop, wearable smart device, etc. The user device may be mobile. As used herein a mobile user device may include a device that is portable and utilizes a portable power supply. The user device may be able to connect to a network such as a telecommunication network allowing nodes (e.g., hosts, computing devices, phones, servers, printers, networking hardware, etc.) to exchange data with each other utilizing wired and/or wireless data links. The user device may be equipped with Wi-Fi capabilities, Wi-Fi direct capabilities, Bluetooth capabilities, Bluetooth Low Energy (BLE) capabilities, near field communication capabilities, and/or global positioning system capabilities.

As used herein, a print job may include a digital file communicated to a printing device for printing. The digital file may include data describing a format of a physical print out. The print job may be communicated directly (e.g., wired and/or wirelessly) to a printing device and/or may be routed to a printing device through an access point and/or through a centralized print server.

As used herein, a printing device may include a printer and/or a multi-function printer. A printing device may be able to connect to a network such as a telecommunication network allowing nodes (e.g., hosts, computing devices, phones, servers, printers, networking hardware, etc.) to exchange data with each other utilizing wired and/or wireless data links. A printing device may be equipped with Wi-Fi capabilities, Wi-Fi direct capabilities, Bluetooth capabilities, Bluetooth Low Energy capabilities, near field communication capabilities, and/or global positioning system capabilities.

A user device may communicate a print job to a printing device utilizing a connection. A connection may include a shared data link supported by a commonly utilized network (wired, wireless, etc.) and/or a peer-to-peer (P2P) connection (e.g., Wi-Fi direct, etc.) between the user device and the printing device. The connection may be established between the user device and the printing device prior to communicating the print job. The connection may be established by prior association through the commonly utilized network. A user device may not be able to identify a printing device or print to a printing device in an environment without the prior connection through commonly utilized network connection. A mobile user device may not be able to determine the proximity of printing devices without the prior connection through commonly utilized network connection.

Examples of the present disclosure may eliminate the limitations of utilizing an existing connection between a user device and a printing device to establish an identity of a printing device, determine the proximity of the printing device to the user device, and identify a data connection between the printing device and the user device. Examples of the present disclosure may include determining that a source of a received first beacon is within a proximity of a user device, comparing a portion of the received first beacon to a portion of a received second beacon associated with a printing device, confirming that the source of the received first beacon is the printing device based on the comparison, and identifying a connection between the printing device and the user device.

FIG. 1 illustrates a diagram of an example system 100 for connection identification, according to the present disclosure. As illustrated in FIG. 1, the system 100 may include a user device 102, a printing device 104, a first beacon 106, a second beacon 108, and a proximity 110.

The user device 102 may include a mobile user device capable of generating or communicating a print job. The user device 102 may have the capability to detect, consume, respond to, communicate via, and/or send a beacon. For example, the user device 102 may include a receiver and/or a transmitter for receiving and/or transmitting a type of beacon. For example, the user device 102 may include a receiver and/or a transmitter of Wi-Fi, Wi-Fi direct, and/or BLE signal.

A proximity 110 may be associated with the user device 102. A proximity 110 may include a physical proximity or distance from the user device 102. The proximity 110 may include a range of distance around the user device 102. For example, the proximity 110 may include one meter of physical distance in any direction from the user device 102. The proximity 110 may be a physical distance within which a beacon may be detected. The proximity 110 may correspond to a signal strength associated with a detected beacon that may correspond to an average physical distance.

The printing device 104 may include a printer and/or a multifunction printer capable of printing a print job. The printing device 104 may have the capability to detect, consume, respond to, communicate via, and/or send a beacon. For example, the printing device 104 may include a receiver and/or a transmitter for transmitting a type of beacon. For example, the printing device 104 may include a receiver and/or a transmitter of Wi-Fi, Wi-Fi direct, and/or BLE signal.

The printing device 104 may transmit a first beacon 106. The printing device 104 may include a one-way transmitter for broadcasting the first beacon 106 without listening for or receiving responses to the first beacon 106. In this manner, the printing device 104 may utilize less power in transmitting the first beacon 106 than would be utilized by also receiving responses to the first beacon 106. A first beacon 106 may include a BLE beacon. Transmission of the BLE beacon by the printing device 104 may not utilize or demand utilization of an existing paired connection between the printing device 104 and the user device 102 in order to facilitate communication.

A first beacon 106 may include a signal broadcasting an identifier of the source (e.g., a beacon transmitter, a printing device 104 associated with the beacon transmitter, etc.) of the first beacon 106. For example, the first beacon 106 may include a universally unique identifier and/or other bytes of information that may be received by compatible receiver and/or utilized by a compatible application or operating system (e.g., on a user device 102). The first beacon 106 may include a unique Media Access Control (MAC) address of the source of the first beacon 106 and/or a data payload.

The first beacon 106 may be utilized by a user device 102 to determine a physical location of the source of the beacon. For example, the first beacon 106 may be received and/or utilized by a user device 102 to determine a relative location of a source of the first beacon 106 to the user device 102. The first beacon 106, by virtue of being received at the user device 102 and/or received at the user device 102 at a particular received signal strength, may indicate that the source of the first beacon 106 is within the proximity 110 of the user device 102. For example, when a user device 102 detects a first beacon 106 and/or a first beacon 106 at a particular signal strength, the user device 102 may determine that a source of the first beacon 106 is within the proximity 110 of the user device 102. As a user device 102 is moved throughout various environments, the user device 102 may update the beacons it has received. In an example, a user device 102 may update a list of beacons and/or beacon sources within its proximity 110 as it is moved relative to printing devices and beacons. Updating a list of beacons may include modifying a position of a particular beacon on a list of available beacons. For example, when a beacon is first detected it may be placed near a top or primary position on a list of available beacons. In an example, when a beacon is no longer detected it may be removed from or moved down the list to a secondary position on a list of available beacons. Updating the list of beacons may include presenting the list of beacons. Presenting the list of beacons may include reordering the list such that beacons that have more recently been detected within the proximity 110 of the user device 102 are given a higher priority within the list The printing device 104 may transmit a second beacon 108. The printing device 104 may include a transmitter and/or receiver for broadcasting and/or receiving data across a direct negotiated link between the printing device 104 and the user device 102. The second beacon 108 may include a signal associated with a peer-to-peer data link utilizing Wi-Fi specifications without an intermediary access point between the printing device 104 and the user device 102. The second beacon 108 may be associated with a soft access point. A soft access point may include instructions (e.g., software) executable by a processing resource to facilitate a wireless connection between the printing device 104 and the user device 102 without utilizing additional network hardware and/or access points outside of those of the printing device 104. For example, the second beacon 108 may include a signal associated with a Wi-Fi direct peer-to-peer link. The printing device 104 may be the Wi-Fi direct host. As a Wi-Fi direct host, the printing device 104 may allow a user device 102 that comes in range of the second beacon 108 (e.g., Wi-Fi direct signal) to connect to the printing device 104 utilizing a version of a Wi-Fi Protected Setup (WPS). The second beacon 108 may include a signal that advertises the existence of an associated device (e.g., printing device 104) and/or an associated service (e.g., printing). The second beacon 108 may include a MAC address of the printing device 104.

The user device 102 may receive the second beacon 108. The user device 102 may utilize the second beacon 108 to identify a printing device 104 and/or a service offered by the printing device 104. The user device 102 may utilize the second beacon 108 to establish a direct connection to the printing device 104 without the use of intermediary access point hardware.

The user device 102 may compare a received first beacon 106 to a received second beacon 108. The user device 102 may compare a portion of the received first beacon 106 to a portion of the received second beacon 108. For example, the user device 102 may compare a portion of the MAC address included in the first beacon 106 to a portion of the MAC address included in the second beacon 108. A match between the portion of the received first beacon 106 and the portion of the received second beacon 108 may indicate that the source of the first beacon 106 and the source of the second beacon 108 is the same device (e.g., printing device 104). Therefore, the user device 102 may confirm that the source of the first beacon 106 and the source of the second beacon 108 is the same printing device 104.

The user device 102 may identify a connection between the printing device 104 and the user device 102. As used herein, a connection between the printing device 104 and the user device 102 may include a wired, wireless, Wi-Fi, Wi-Fi direct, Wireless direct, Bluetooth, etc. connection for transmitting and/or receiving data such as a print job.

The user device 102 may identify a connection between the printing device 104 and the user device 102 responsive to a print command being received by the user device 102. Receiving a print command may include receiving a request to submit a print job to a printing device 104.

Identifying a connection between the printing device 104 and the user device 102 may include identifying an existing connection between the printing device 104 and the user device 102. Identifying an existing connection may include identifying a connection that was established prior to submission of the print job and/or prior to the confirmation that the source of the first beacon 106 and the source of the second beacon 108 is the same printing device 104, For example, identifying an existing connection between the printing device 104 and the user device 102 may include determining whether the printing device 104 and the user device 102 are on a same network (e.g., a same wireless network, a same wired network, etc.). In an example, identifying an existing connection between the printing device 104 and the user device 102 may include determining whether the printing device 104 and the user device 102 have an existing direct and/or peer-to-peer connection (e.g., Wi-Fi direct, Wireless direct, Bluetooth, etc.).

The user device 102 may select the printing device 104 to receive and/or perform a print job from the user device 102 responsive to identifying an existing connection. For example, rather than provide a prompt on a user device 102 soliciting a selection of the printing device 104 to receive and/or perform a print job, the user device 102 may select the printing device 104 upon identifying the existing connection between the printing device 104 and the user device 102, confirming that the source of the first beacon 106 and the source of the second beacon 108 is the printing device 104, and/or determining that the source of the first beacon 106 is within the proximity 110 of the user device 102.

Select the printing device 104 responsive to identifying the existing connection between the printing device 104 and the user device 102, confirming that the source of the first beacon 106 and the source of the second beacon 108 is the printing device 104, and/or determining that the source of the first beacon 106 is within the proximity 110 of the user device 102 may allow the user device 102 to select a printing device 104 that is relatively near to the user device 102 to handle a print job from the printing device 104 utilizing an existing connection. Alternatively, a printing device 104 may be excluded from connection with the user device 102, even if an existing connection is identified between the two, if the printing device 104 is outside of the proximity 110 of the user device 102 (e.g., the user device 102 is moved away from the printing device 104 such that the first beacon 106 and/or second beacon 108 are no longer received by the user device 102).

Identifying a connection between the printing device 104 and the user device 102 may include identifying a potential alternative connection between the printing device 104 and the user device 102 responsive to a determination that no existing connection is identified. Identifying a potential alternative connection between the printing device 104 and the user device 102 may include identifying a network (e.g., a wireless network, a wired network, etc.) that the printing device 104 is utilizing. For example, identifying a potential alternative connection between the printing device 104 and the user device 102 may include identifying a network that the user device 102 may utilize in common with the printing device 104. Identifying a potential alternative connection between the printing device 104 and the user device 102 may include identifying and connecting to a network that will allow communication of data such as a print job from user device 102 to the printing device 104.

Identifying a potential alternative connection between the printing device 104 and the user device 102 may include identifying a direct and/or peer-to-peer connection (e.g., Wi-Fi direct, Wireless direct, Bluetooth, etc.) that may be established between the user device 102 and the printing device 104. Identifying a potential alternative connection between the printing device 104 and the user device 102 may include identifying and connecting via a direct and/or peer-to-peer connection to the printing device 104.

Identifying a potential alternative connection between the printing device 104 and the user device 102 may include soliciting a selection of a printing device 104 to receive and/or perform a print job. Soliciting a selection of a printing device 104 to receive and/or perform a print job may include presenting on a display of a user device 102 a list of available printing devices along with corresponding potential alternative connection identifying information. Presenting the list of available printing devices may include communicating information regarding the physical distance from the printing devices and whether the printing devices are within the proximity 110 of the user device 102. Presenting the list of available printing devices may include reordering the list such that printing devices that have more recently been detected within the proximity 110 of the user device 102 are given a higher priority within the list. Printing devices that are not detected upon an updated determination of whether a first beacon 106 is within the proximity 110 of the user device 102 may be excluded from the list of printing devices or given a lower priority within the list.

The user device 102 may receive a selection of a printing device 104 from a displayed list of printing devices. The user device 102 may establish a connection with the selected printing device 104. For example, the user device 102 may establish a connection via the potential alternative connection with the selected printing device 104.

The user device 102 may transmit data such as a print job to the printing device 104 over the established connection. For example, the user device 102 may transmit a print job and/or a print command to a selected printing device 104 via the potential alternative connection once established.

The printing device 104 may print the print job received from the user device 102. For example, a printing device 104 may print the print job received from the user device 102 over an established existing connection or over a potential alternative connection once established depending on the connection identified by the user device 102.

The system 100 may be utilized to select a printing device 104 that is near (e.g., within proximity 110) to a user device 102 to receive a print job from the user device 102. The system 100 may facilitate the connection of the user device 102 to the printing device 104 identified as being near the user device 102 based on the reception of the first beacon 106 and the second beacon 108 at the user device 102. The printing device 104 and the user device 102 may not have a prior association and the user device 102 may simply be passing through an environment where the printing device 104 happens to be located. The system 100, by comparing a portion of a first beacon 106 and a portion of a second beacon 108, may confirm the printing device 104 as the source of the first beacon 106 and the second beacon 108 and may identify a connection between the user device 102 and the printing device 104. As such, the system 100 may allow a mobile user device 102 to utilize a near or nearest printing device 104 to execute a print job whenever and wherever the desire to print arises without involving cumbersome prior associations to find a printing device 104 and/or establish a connection between the user device 102 and the printing device 104.

Figure 2:
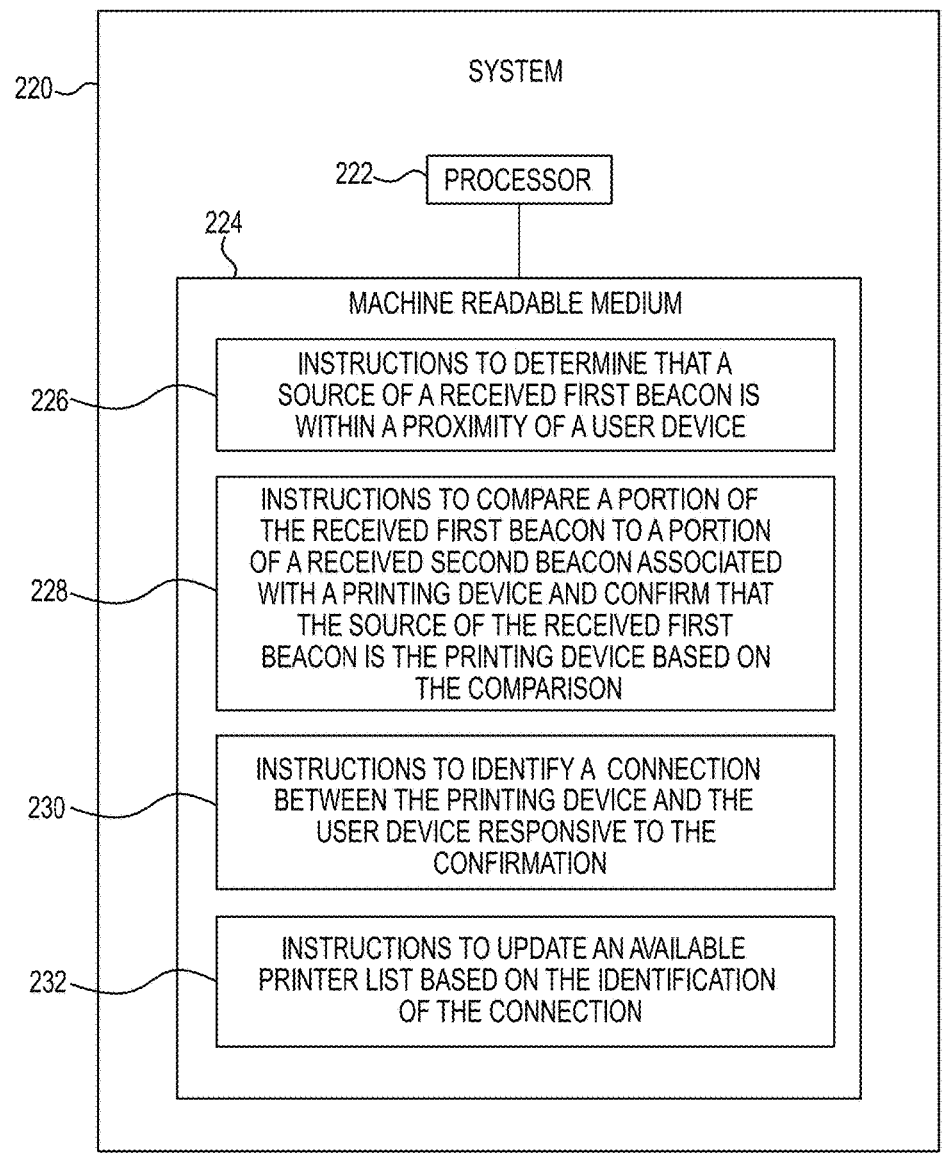
FIG. 2 illustrates a block diagram of an example system for connection identification, according to the present disclosure.

FIG. 2 is a block diagram of an example system 220 for connection identification, according to the present disclosure. System 220 may be the same as or different than, the system 100 illustrated in FIG. 1. System 220 may include at least one computing device that is capable of communicating with at least one remote system. In the example of FIG. 2, system 220 includes a processor 222 and a machine-readable medium 224. Although the following descriptions refer to a single processor and a single machine-readable medium, the descriptions may also apply to a system with multiple processors and machine-readable mediums. In such examples, the instructions may be distributed (e.g., stored) across multiple machine-readable mediums and the instructions may be distributed (e.g., executed by) across multiple processors.

Processor 222 may be a single or a plurality of central processing units (CPUs), microprocessors, and/or other hardware devices suitable for retrieval and execution of instructions stored in machine-readable medium 224. In the particular example shown in FIG. 2, processor 222 may receive, determine, and send instructions 226, 228, 230, and 232 for connection identification. As an alternative or in addition to retrieving and executing instructions, processor 222 may include a single or a plurality of electronic circuits comprising a number of electronic components for performing the functionality of a single or a plurality of the instructions in machine-readable medium 224. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable medium 224 may be any electronic, magnetic, optical, or other physical storage device that stores executable instructions. Thus, machine-readable medium 224 may be, for example, Random Access Memory (RAM), an Electrically-Erasable Programmable Read-Only Memory (EEPROM), a storage drive, an optical disc, and the like. Machine-readable medium 224 may be disposed within system 220, as shown in FIG. 2. In this situation, the executable instructions may be "installed" on the system 220. Additionally and/or alternatively, machine-readable medium 224 may be a portable, external or remote storage medium, for example, that allows system 220 to download the instructions from the portable/external/remote storage medium. In this situation, the executable instructions may be part of an "installation package". As described herein, machine-readable medium 224 may be encoded with executable instructions for virtual presentation.

Referring to FIG. 2, instructions 226, when executed by a processor (e.g., 222), may cause system 220 to determine that a source of a first beacon received by a user device is within a proximity of the user device. The determination of whether a first beacon received by a user device is within the proximity of the user device may occur repeatedly and be performed continuously or periodically. A first beacon may be determined to be within a proximity of a user device if it is received and/or received at a threshold received signal strength at a user device. The presence and/or strength of a first beacon received at a mobile user device from a substantially stationary source may change as the mobile device is moved to different distances from the source. The determination of whether a first beacon received by a user device is within the proximity of the user device may occur responsive to a command to print being received at the user device.

It may be desirable to identify and/or include in an available printer list those printing devices that are physically close, e.g., within an approximately two meter proximity of the user device. For example, it may be convenient for a user to print at a printing device that is closest or within a close range (e.g., 2 meters). Determining the printing devices that are within the close proximity may include determining that the source of the received first beacon is within a proximity of a user device.

Referring to FIG. 2, instructions 228, when executed by a processor (e.g., 222), may cause system 220 to compare a portion of the received first beacon to a portion of a received second beacon. A first beacon may be associated with a beacon source such as a first transmitter. The beacon source may be associated with (e.g., integral with) a printing device. The second beacon may be associated with a beacon source such as a second transmitter. The second beacon may be associated with (e.g., integral with) a printing device too. The first beacon may be received by the user device and the second beacon may be received by the user device. Without a prior association, the user device may lack a way to determine whether the first beacon and the second beacon are associated with the same printing device.

The instructions 228, when executed by a processor (e.g., 222), may cause system 220 to confirm that the source of the first beacon and the source of the second beacon is the printing device (e.g., respective transmitter portions of a printing device). Confirmation that the source of the first beacon and the source of the second beacon is the same printing device may be based on the comparison of a portion of the first beacon to a portion of the second beacon. For example, the source of the first beacon and the source of the second beacon may be confirmed as the printing device when a MAC address included in a first beacon to a MAC address included in a second beacon matches.

Referring to FIG. 2, instructions 230, when executed by a processor (e.g., 222), may cause system 220 to identify a connection between the printing device and the user device. The connection may be identified responsive to a confirmation that the source of the first beacons and the source of the second beacon is the same printing device. Identifying a connection may include identifying an established connection between a user device and a printing device. Identifying a connection may include identifying a potential alternative connection between the printing device and the user device when an established connection is not identified. In an example, the printing device may be associated with a first network (e.g., an office or home based wireless computer network) and a user device may be associated with a second network (e.g., a cellular data network). The identity of the first network (e.g., location, log on information, sign on credentials, instructions for connection, etc.) may be determined based on the first beacon. That is, the first beacon may include information identifying the network that the printing device is utilizing and/or instructions on how to associate the user device with the network.

Referring to FIG. 2, instructions 232, when executed by a processor (e.g., 222), may cause system 220 to update an available printer list. The available printing device may be updated based on the identification of a connection between the user device and a printing device. An available printer list may include a list of printing devices that are available to receive and/or execute a print job from a user device. A printing device may be available to receive and/or execute a print job from a user device when it shares a data connection with the user device. The data connection may be the identified established data connection or the identified potential alternative connection once it has been established. A printing device may be available to receive and/or execute a print job from a user device when it is confirmed as the source of the first beacon and the second beacon and the first beacon is within proximity of a user device. If the printing device is not confirmed as the source of the first beacon and the second beacon (e.g., the portion of the first beacon compared to the portion of the second beacon does not produce a match) then the printing device may be excluded from the available printer list or moved down in priority in a list of available printers. If the first beacon associated with a printing device is not within a proximity of the user device then the printing device may be excluded from the available printer list or moved down in priority in a list of available printers. The available printer list may be displayed on a user device as part of a solicitation for a selection of a printer to handle a print job.

Figure 3:
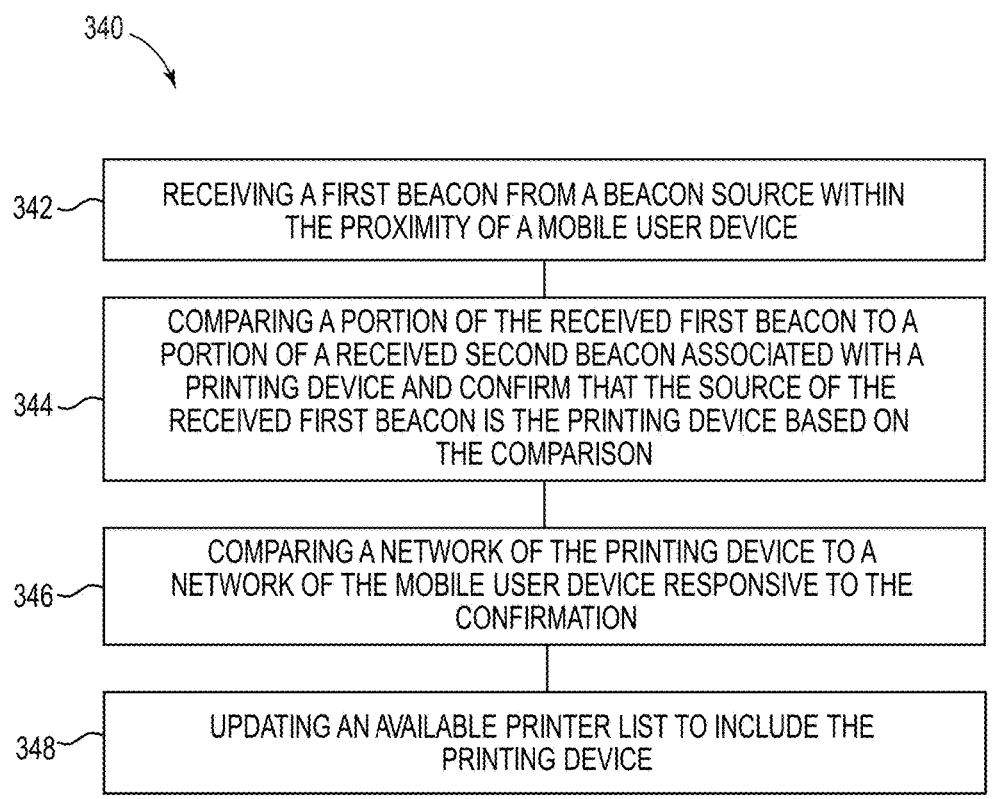
FIG. 3 illustrates an example method for connection identification, according to the present disclosure.

FIG. 3 illustrates an example method 340 for connection identification, according to the present disclosure. At 342, the method 340 includes receiving a first beacon. The first beacon may be a first beacon from a first source such as a BLE transmitter. The first beacon may be received from a beacon source once the beacon and/or the beacon source are within a proximity of a mobile user device. A plurality of first beacons may be received within the proximity of the mobile user device. Each of the plurality of first beacons may be generated from a distinct first beacon source within the proximity of the mobile user device. Each of the plurality of first beacon and corresponding first beacon sources may be associated with a separate printing device. For example, a mobile user device may be moved through a workplace environment and receive a plurality of first beacons from a plurality of first beacon sources associated with a plurality of nearby printing devices within the proximity of the mobile user device.

At 344, the method 340 includes comparing a portion of a first received beacon to a portion of a second received beacon. The second received beacon may be a beacon associated with a printing device. At 344, the method 340 includes confirming that the source of the received first beacon is the particular printing device based on the comparison between the two beacons.

At 346, the method 340 includes comparing a network of the printing device to a network of the mobile user device responsive to the confirmation that the source of the first and second beacons is the printing device. Comparing the network of the mobile user device and the network of the printing device may include determining if the printing device and the mobile user device may be connected utilizing an established connection or a potential alternative connection. Comparing the network of the mobile user device and the network of the printing device may include connecting the mobile user device to the printing device utilizing an identified connection responsive to a selection of a printing device received by the mobile user device.

At 348, the method 340 includes updating an available printer list to include the printing device. Updating an available printer list may include updating a list of printing devices available to accept a print job from a mobile user device. The list of printing devices may include printing devices that are within the proximity of the user device, are associated with a first and second beacon, and/or can receive and/or execute print jobs over a data connection. In an example, the available printer list may include a plurality of printing devices that are within the proximity of the user device. It may be computationally costly to determine a closest printing device among a plurality of printing devices within a proximity of the user device. Therefore, the user device may select any one, with equal probability, of the printing devices from the available printer list to handle a job.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, an element and/or feature can refer to a single or a plurality of such elements and/or features.

What is claimed:

1. A system, comprising:
    a processor; and
    instructions executable by the processor to:
        identify a source of a received first beacon, of a plurality of received first beacons from a plurality of sources, that is within a proximity of a user device;
        identify a printing device of a plurality of printing devices that is the source of the received first beacon by a comparison of a portion of the received first beacon to a portion of a received second beacon received from the printing device;
        identify a connection between the printing device and the user device; and
        display, with the user device, an updated available printer list including the identified printing device prioritized over another printing device of the plurality of printing devices based on an identification of the printing device as the source of the received first beacon within the proximity of the user device and the identification of the connection.

2. The system of claim 1, further comprising the instructions executable by the processor to identify an existing connection between the printing device and the user device as the connection.

3. The system of claim 2, further comprising the instructions executable by the processor to select the printing device to receive a print job responsive to identifying the existing connection.

4. The system of claim 1, further comprising the instructions executable by the processor to identify a potential alternative connection between the printing device and the user device as the connection when no existing connection is identified.

5. The system of claim 1, wherein the first beacon is a Bluetooth® low energy signal.

6. The system of claim 1, wherein the proximity is determined based on a signal strength of the first beacon.

7. The system of claim 1, wherein the second beacon is a Wi-Fi direct signal.

8. A non-transitory computer-readable medium containing instructions executable by a processor to cause the processor to:
    identify a source of a received first beacon, of a plurality of received first beacons from a plurality of sources, that is within a proximity of a user device;
    identify a printing device of a plurality of printing devices that is the source of the received first beacon by a comparison of a portion of the received first beacon to a portion of a received second beacon received from the printing device;
    identify a connection between the printing device and the user device responsive to a confirmation;
    display, with the user device, an available printer list including the identified printing device prioritized over another printing device of the plurality of printing devices based on an identification of the printing device as the source of the received first beacon within the proximity of the user device and the identification of the connection; and
    send a print job to the printing device responsive to a selection of the printing device from the available printer list received from the user device.

9. The medium of claim 8, wherein the printing device is associated with a first network and the user device is associated with a second network.

10. The medium of claim 9, further comprising instructions to exclude the printing device when the source of a received first beacon is not determined to be within the proximity of the user device.

11. The medium of claim 9, wherein an identity of the first network is determined based on the first beacon.

12. The medium of claim 8, wherein the instructions to determine that the source of the received first beacon is within the proximity of the user device are executed responsive to a command to print a document.

13. A method comprising,
    receiving a plurality of first beacons from a plurality of sources;

identifying a source of a received first beacon of a plurality of received first beacons, is within a proximity of a mobile user device;

identifying a printing device of a plurality of printing devices that is the source of the received first beacon by a comparison of a portion of the received first beacon to a portion of a received second beacon received from the printing device;

comparing a network of the printing device to a network of the mobile user device responsive to a confirmation;

identifying whether an existing connection between the printing device and the mobile user device based on the comparison of the network of the printing device and the network of the mobile user device;

establishing an alternate connection between the printing device and the mobile user device; and updating an available printer list to include the printing device responsive to a determination that the printing device is available to receive a print job from the mobile user device utilizing the alternate connection.

14. The method of claim 13, wherein the available printer list includes a plurality of printing devices within the proximity of the mobile user device.

15. The method of claim 14, further comprising selecting a printing device from the available printer list to handle a print job.

* * * * *